United States Patent [19]

Hayashi

[11] Patent Number: 4,598,954
[45] Date of Patent: * Jul. 8, 1986

[54] DUAL BRAKING DEVICE FOR MOTORCYCLE

[75] Inventor: Tsutomu Hayashi, Tokyo, Japan

[73] Assignee: Honda Giken Kogyo Kabushiki Kaisha, Tokyo, Japan

[*] Notice: The portion of the term of this patent subsequent to Aug. 14, 2001 has been disclaimed.

[21] Appl. No.: 417,093

[22] Filed: Sep. 13, 1982

[30] Foreign Application Priority Data

Sep. 19, 1981 [JP] Japan ............................ 56-148193

[51] Int. Cl.⁴ .................... B60T 13/00; F16D 65/32
[52] U.S. Cl. .......................... 303/6 A; 188/106 P; 188/345
[58] Field of Search ............ 188/106 F, 106 P, 106 R, 188/344, 345, 349; 303/6 A; 60/547.1, 550, 579, 580

[56] References Cited

U.S. PATENT DOCUMENTS

| | | | |
|---|---|---|---|
| 3,159,974 | 12/1964 | Rodgers | 188/345 |
| 3,412,556 | 11/1968 | Rike et al. | 188/345 |
| 3,554,334 | 1/1971 | Shimano | 188/345 |
| 4,176,886 | 12/1979 | Watanabe | 303/6 A |
| 4,465,322 | 8/1984 | Hayashi | 303/6 A |

FOREIGN PATENT DOCUMENTS 0099847 8/1981 Japan .................................. 188/344

Primary Examiner—Bruce H. Stoner, Jr.
Assistant Examiner—Alvin Oberley
Attorney, Agent, or Firm—Lyon & Lyon

[57] ABSTRACT

A motorcycle has a front wheel brake with a manual actuator, and has a rear wheel brake with a pedal-type actuator. First and second pistons are slidably mounted within the same bore in a body and define within the bore a first oil chamber between the first piston and the end of the bore, and a second oil chamber between the pistons. The first oil chamber is connected to operate the front wheel brake, and the second oil chamber is connected to operate the rear wheel brake. The manual actuator is hydraulically connected to move the second brake piston toward the first piston, and the pedal-type actuator is mechanically connected to move the second piston in the same direction, so that either or both of the brake actuators may operate both of the brakes.

1 Claim, 6 Drawing Figures

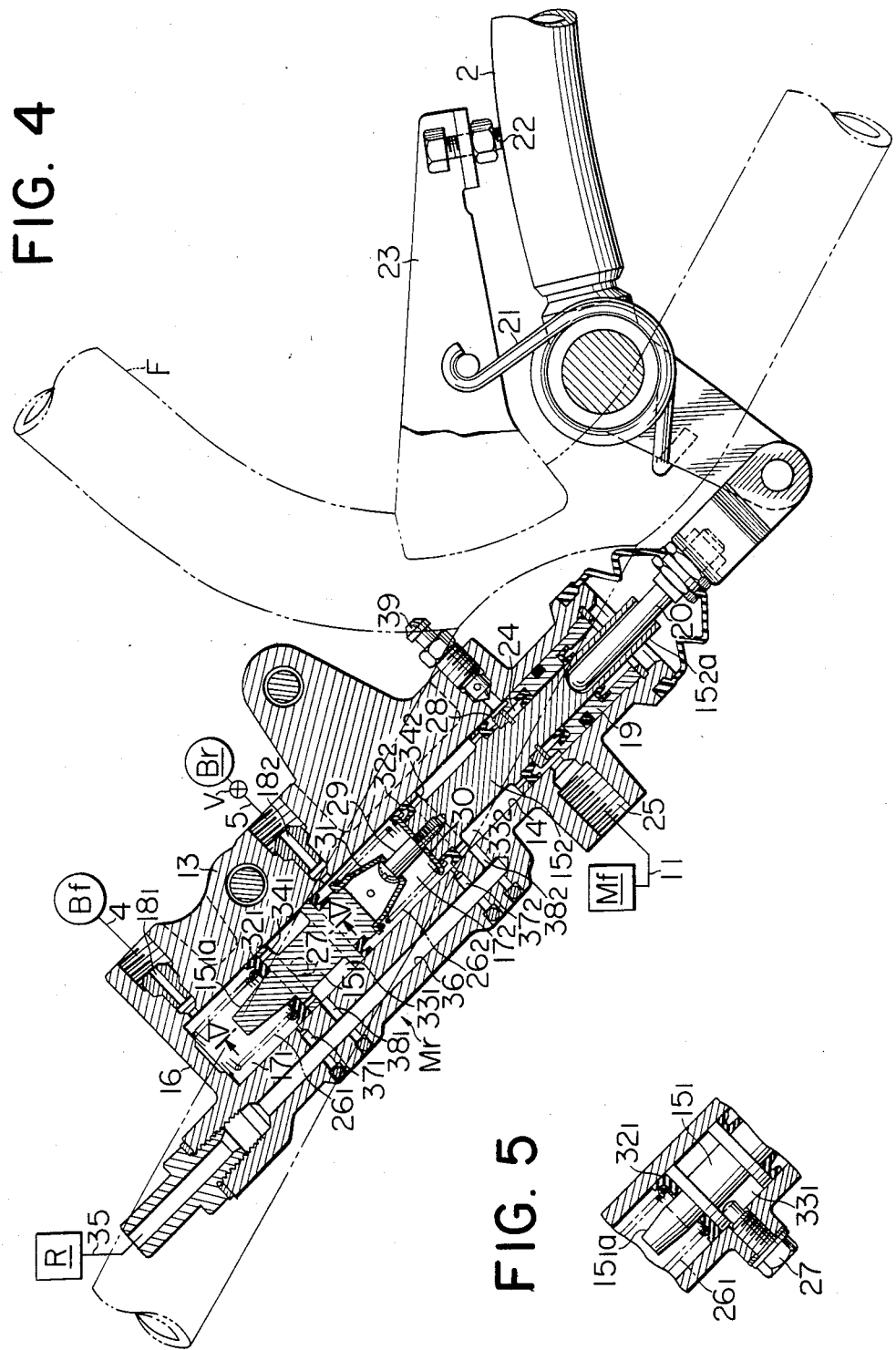

DUAL BRAKING DEVICE FOR MOTORCYCLE

This invention relates to a braking device for a motorcycle. More particularly, the present invention relates to a braking device having a hand-operated first brake actuator member, and a foot-operated second brake actuator member.

In conventional braking devices for motorcycles in general, a front wheel brake for applying the braking force to a front wheel and a rear wheel brake for applying the braking force to a rear wheel are independently operated when the first and second brake actuator members are operated. However, the brake operation would be simplified and become more desirable if both front and rear wheel brakes could be operated by the brake input of either the first or second brake actuator members.

The present invention is primarily directed to provide a braking device which can satisfy the requirement described above.

In one aspect of the present invention, there is provided a braking device for a motorcycle which comprises a manual first brake actuator member, a pedal type second brake actuator member, a brake oil pressure generator including a first brake oil pressure chamber equipped with a first output port, and a second brake oil pressure chamber equipped with a second output port. The oil pressure generator is capable of generating brake oil pressure in both of the first and second brake oil pressure chambers upon receiving the input from either the first or second brake actuator members and producing the brake oil pressure at the first and second output ports. A front wheel brake communicates with the first output port, operative by the output oil pressure at the first output port and applying the braking force to a front wheel. A rear wheel brake communicates with the second output port, operative by the output oil pressure of the second output port and applying the braking force to a rear wheel.

In another aspect of the present invention, there is provided a braking device for a motorcycle which comprises a manual first brake actuator member; a pedal type second brake actuator member; a brake oil pressure generator including a first brake oil pressure chamber equipped with a first output port, and a second brake oil pressure chamber equipped with a second output port. The oil pressure generator is capable of generating the brake oil pressure in both of the first and second brake oil pressure chambers upon receiving the input from either the first or second brake actuator members and producing the brake oil pressure at the first and second output ports. A front wheel brake communicates with the first output port, operative by the output oil pressure at the first output port and applying the braking force to a front wheel. A rear wheel brake communicates with the second output port, operative by the output oil pressure of the second output port and applying the braking force to a rear wheel. The brake oil pressure generator further includes means for receiving the sum of the operation force of both of the first and second brake actuator members as the brake input when the first and second brake actuator members are simultaneously operated.

The above and other objects, features and advantages of the present invention will become apparent from the following detailed description of a preferred embodiment when taken in conjunction with the accompanying drawings.

The accompanying drawings illustrate the braking device in accordance with one embodiment of the present invention, wherein:

FIG. 4 is an enlarged longitudinal sectional elevation of the rear master cylinder in the braking device.

FIG. 5 is a sectional view taken along line V—V of FIG. 4.

The motorcycle is equipped with a brake lever 1 as a first brake actuator member on a steering handle H and a front master cylinder $M_f$ actuated by the brake lever. It also includes a brake pedal 2 as a second brake actuator member at a lower part of the frame F and a rear master cylinder $M_r$ as a brake oil pressure generator which is operative by the brake input from either the brake pedal 2 or the brake lever 1. The input from the brake lever 1 to the rear master cylinder $M_r$ is applied as an output oil pressure from the front master cylinder $M_f$, and the input from the brake pedal 2 to the rear master cylinder $M_r$ is transmitted mechanically, as will be described later in detail.

The rear master cylinder $M_r$ is connected to a pair of right and left oil pressure type front wheel brakes $B_f$ for braking the front wheel $W_f$ via an oil passage 4. The rear master cylinder $M_r$ is connected to a single oil pressure type rear wheel brake $B_r$ for braking the rear wheel $W_r$ via an oil passage 5. A conventional proportional decompression valve V is interposed in the oil passage 5.

Figure 1:
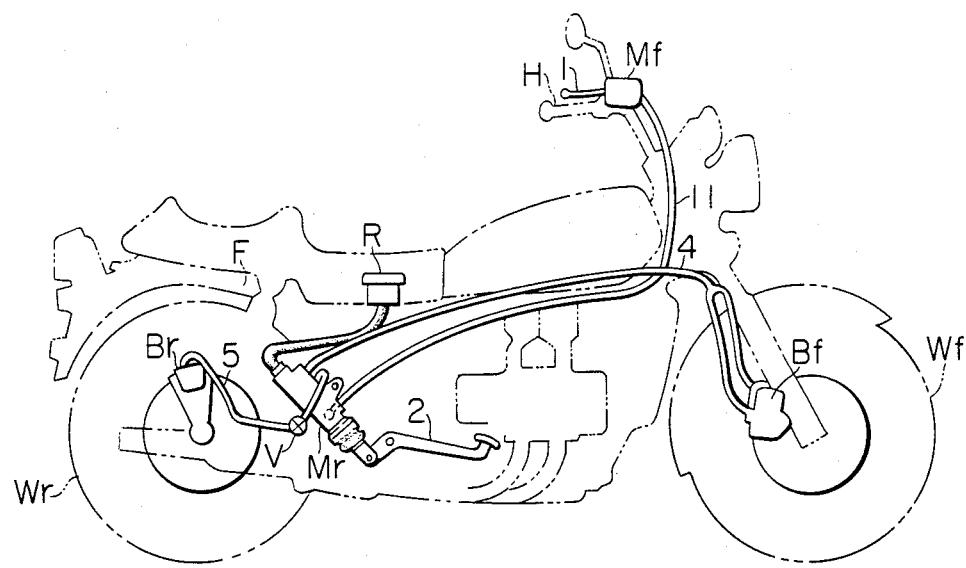
FIG. 1 is a side elevation showing a preferred embodiment of this invention as applied to a motorcycle.
Figure 2:
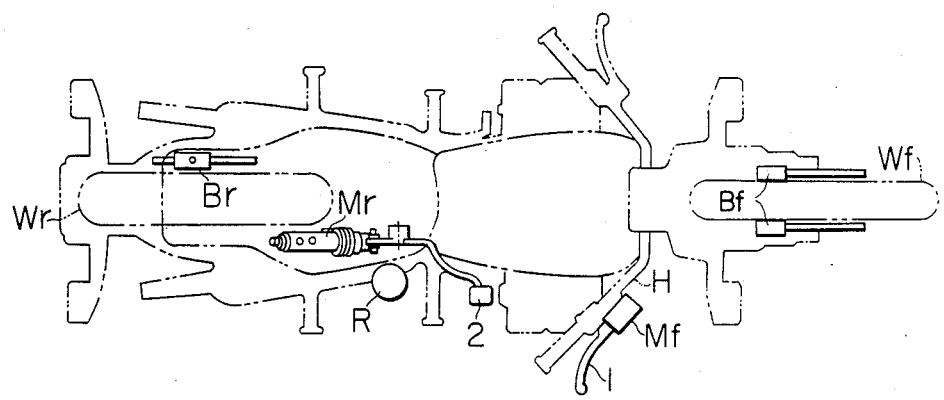
FIG. 2 is a plan view.
Figure 3:
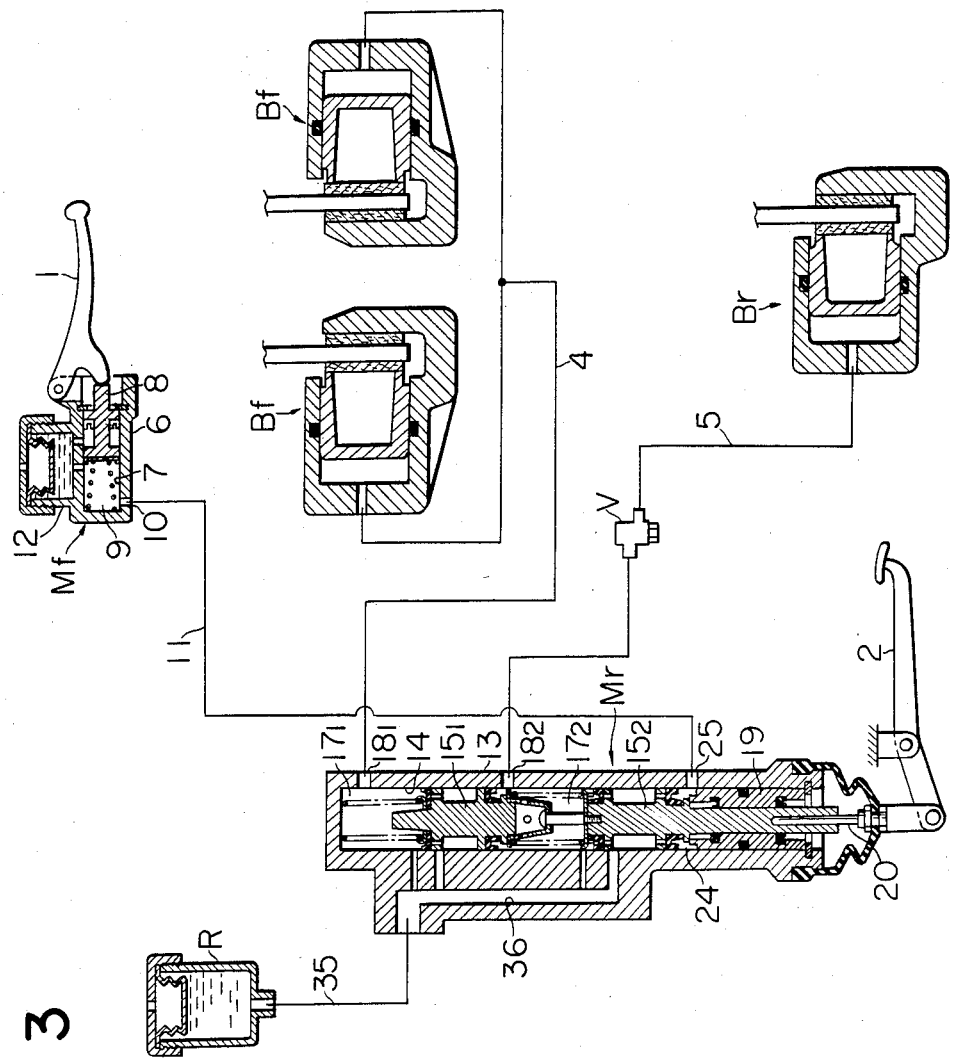
FIG. 3 is an oil pressure circuit diagram of the braking device.

The front master cylinder $M_f$ is constructed in a known single type and this cylinder will be described in detail with reference to FIG. 3.

A single piston 8 which is operated by the brake lever 1 is slidably fitted to a cylinder bore 7 of the cylinder main body 6 and defines an oil pressure chamber 9 in front of the cylinder bore 7. An oil passage 11 communicating with the rear master cylinder $M_r$ is connected to the output port 10 of this oil pressure chamber 9. Accordingly, when the brake lever 1 is actuated to advance the piston 8, oil pressure is generated inside the oil pressure chamber 9 and is applied to the rear master cylinder $M_r$ from the output port 10. The cylinder main body 6 has an integral reservoir 12 which can feed an operation oil to the oil pressure chamber 9.

The rear master cylinder $M_r$ is of a tandem type and will be described in detail with reference to FIG. 4. First and second brake pistons $15_1$ and $15_2$ are slidably fitted to a cylinder bore 14 of the cylinder main body 13 from above the bore 14 and in series with each other. These first and second brake pistons $15_1$, $15_2$ define a first brake oil pressure chamber $17_1$ in cooperation with the upper end wall 16 of the cylinder bore 14 inside the cylinder bore. The pistons $15_1$, $15_2$ define a second brake oil pressure chamber $17_2$ between them. The first and second brake oil pressure chambers $17_1$, $17_2$ have first and second output ports $18_1$, $18_2$ opening on their side walls, respectively. The oil passage 4 communicating with the front wheel brake $B_f$ is connected to the first output port $18_1$ while the oil passage 5 communicating with the rear wheel brake $B_r$ is connected to the second output port $18_2$.

The second brake piston $15_2$ is provided with an integral piston rod $15_{2a}$ which slidably protrudes outside through a sleeve 19 fitted and fixed to the lower end opening of the cylinder bore 14. The piston rod $15_{2a}$ is interconnected to the brake pedal 2 via a push rod 20. When the brake pedal 2 is operated, therefore, the second brake piston $15_2$ can be pushed upward via the push rod 20. Reference numeral 21 represents a return spring of the brake pedal 2 and reference numeral 22 represents a stopper bolt which is screwed to a bracket 23 extending from the frame F so that the limit of backward movement of the pedal 2 can be adjusted.

Inside the cylinder bore 14, the second brake piston $15_2$ and the sleeve 19 define an oil pressure chamber 24 between them, and the oil passage 11 communicating with the front master cylinder $M_f$ is connected to an input port 25 opening on one side of the chamber 24.

First and second return springs $26_1$ and $26_2$ are placed respectively inside the first and second brake oil pressure chambers $17_1$ and $17_2$ for urging the first and second brake pistons $15_1$ and $15_2$ in their retracting direction, that is, downward. In this case, the set load of the second return spring $26_2$ is smaller than that of the first return spring $26_1$. A stopper bolt 27 is screwed to the cylinder main body 13 in order to restrict the limit of the backward movement of the first brake piston $15_1$. As shown in FIG. 5, this bolt 27 projects into a feed oil chamber $33_1$ to be later described and supports the piston $15_1$. A stopper 28 having a circular clip-like shape is anchored to the piston rod $15_{2a}$ of the piston $15_2$ in order to restrict the limit of the backward movement of the second brake piston $15_2$. This stopper 28 comes into contact with the upper end surface of the sleeve 19.

The second return spring $26_2$ is inserted, while in a compressed state, between a seat 30 fixed to the upper end of the second brake piston $15_2$ by a bolt 29 and a moving seat 31 capable of sliding on the bolt 29 within a limited range of stroke. The moving seat 31 substantially comes into contact with the lower end of the first brake piston $15_1$ when it is spaced apart from the fixed seat 30 for the maximum distance, that is, when both brake pistons $15_1$ and $15_2$ are positioned at their limit of backward movement.

Piston seals $32_1$ and $32_2$ are fitted to the upper ends of the first and second brake pistons $15_1$, $15_2$, respectively. These brake pistons have a reduced diameter at their intermediate portion, around the outer circumference of which are formed the feed oil chambers $33_1$ and $33_2$, respectively. Oil feed ports $34_1$ and $34_2$ are formed on the brake pistons $15_1$ and $15_2$ so as to communicate these oil chambers $33_1$ and $33_2$ with the back of the piston seals $32_1$ and $32_2$.

An oil passage 36 communicating with an oil passage 35, which in turn communicates with the reservoir R, is formed on the cylinder main body 13 in parallel with the cylinder bore 14. The oil passage 36 communicates with relief ports $37_1$, $37_2$ and with supply ports $38_1$, $38_2$. The relief ports $37_1$, $37_2$ open to the first and second brake oil pressure chambers $17_1$, $17_2$ immediately before the piston seals $32_1$, $32_2$, when both brake pistons $15_1$ and $15_2$ are positioned at the limit of their backward movement. The supply ports $38_1$, $38_2$ are constantly open to the oil feed chambers $33_1$, $33_2$.

In FIG. 4, reference numeral 39 represents an air bleeder.

Next, the operation of this embodiment will be described.

When the front master cylinder $M_f$ is operated by the brake lever 1, the oil pressure generated in its oil pressure chamber 9 is applied to the oil pressure chamber 24 of the rear master cylinder $M_r$ from the input port 25 through the oil passage 11 and pushes up the second brake piston $15_2$. The reaction force is borne by the sleeve 19 and is not transmitted to the push rod 20.

When the brake pedal 2 is depressed, the force of depression is mechanically applied to the second brake piston $15_2$ via the push rod 20 so that the second brake piston $15_2$ is likewise pushed up. The oil pressure chamber 24 whose volume increases in this instance only draws on the operation oil inside the reservoir R of the front master cylinder $M_f$ through the oil pressure chamber 9 as well as through the oil passage 11, and no reaction acts upon the brake lever 1.

Accordingly, when the brake lever 1 and the brake pedal 2 are simultaneously operated, the sum of push force by the output oil pressure of the front master cylinder $M_f$ and the push force by the push rod 20 are applied to the second brake piston $15_2$ as the brake input.

When the second brake piston $15_2$ is pushed up, the first and second brake pistons $15_1$ and $15_2$ advance while compressing the respective first and second return springs $26_1$, $26_2$, and after the piston seals $32_1$, $32_2$ pass by the relief ports $37_1$, $37_2$, the oil pressure is generated inside the first and second brake oil pressure chambers $17_1$, $17_2$ in accordance with the advancing distance of the brake pistons $15_1$, $15_2$. The oil pressure generated in the first brake oil pressure chamber $17_1$ is transmitted from the first output port $18_1$ to the front wheel brake $B_f$ via the oil passage 4, and actuates the front wheel brake. The oil pressure generated in the second brake oil pressure chamber $17_2$ is transmitted from the second output port $18_2$ to the rear wheel brake $B_r$. Thus, the braking force is applied to each of the front and rear wheels $W_f$, $W_r$.

Figure 6:
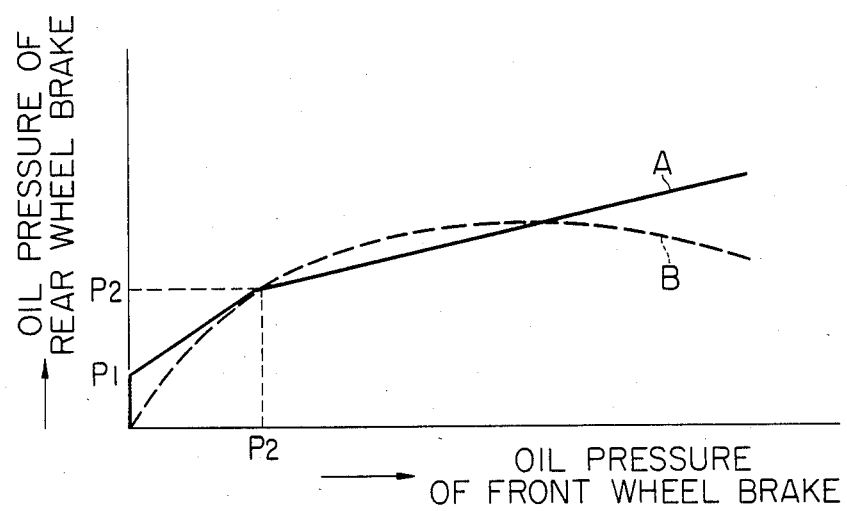
FIG. 6 is a diagram of brake oil pressure distribution ratio characteristics of a rear wheel brake, in which curve A represents the characteristics in accordance with the present invention, and curve B represents ideal characteristics.

As described above, the set load of the second return spring $26_2$ is lower than that of the first return spring $26_1$. At the initial stage of operation of the second brake piston $15_2$, therefore, the second return spring $26_2$ is compressed before the advance of the first brake piston $15_1$ and the oil pressure is first generated inside the second brake oil pressure chamber $17_2$. When this oil pressure reaches a predetermined value $P_1$, the first return spring $26_1$ is compressed and the first brake piston $15_1$ starts advancing. At the same time, the oil pressure is generated inside the first brake oil pressure chamber $17_1$. Since the proportional decompression valve V is interposed in the oil passage 5 between the output port $18_2$ of the second brake oil pressure chamber $17_2$ and the rear wheel brake $B_r$, when the output oil pressure of the second output port $18_2$ reaches a predetermined value $P_2$, the output oil pressure is reduced at a constant ratio by the operation of the proportional decompression valve V and is transmitted to the rear wheel brake $B_r$. On the other hand, the oil passage 4 between the output port $18_1$ of the first brake oil pressure chamber $17_1$ and the front wheel brake $B_f$ is constantly open so that the output oil pressure of the first output port $18_1$ is transmitted to the front wheel brake $B_f$. As a result, the brake oil pressure at each of the front and rear wheel brakes $B_f$, $B_r$ rises along a brake oil pressure distribution line A shown in FIG. 6. This characteristic curve approximates the ideal brake oil pressure distribution curve B for a motorcycle so that the rider of the motorcycle can brake effectively without the demand of unusual skill.

As described in the foregoing, in accordance with the present invention, the brake oil pressure generator equipped with the first and second brake oil pressure chambers communicating with the front and rear wheel brakes, respectively, can be operated by either of the input of the manual first actuator member or the input of the pedal type second brake actuator member. Accordingly, the braking force can be applied by only operating either of the first or second brake actuator member and hence, the brake operation becomes very easy.

In accordance with another aspect of the present invention, the brake oil pressure generator described above is equipped with means for receiving the sum of the operation force of the first and second brake actuator members when they are simultaneously operated. Accordingly, when a large braking force is required, such as when riding double on a motorcycle or when loading cargos on the motorcycle, the necessary large braking force can be easily applied to both front and rear wheel brakes by simultaneously operating the first and second brake actuator members, and braking can be effected easily and gently.

Having fully described my invention, it is to be understood that I am not to be limited to the details herein set forth but that my invention is of the full scope of the appended claims.

I claim:

1. A braking device for a motorcycle having both a front wheel brake and a rear wheel brake, comprising a main oil pressure generator including a first pressurized oil output means for operating the front wheel brake and having a first chamber, a first piston for pressurizing oil in said first chamber and a restraining means resisting movement of said first piston in said first chamber and a second pressurized oil output means for operating the rear wheel brake and said first piston and having a second chamber and a second piston for pressurizing oil in said second chamber, said first piston forming a wall of said second chamber such that pressurization of said first chamber is resisted by said resisting means below a preselected pressure in said second chamber, a hand actuated brake lever including a remote oil pressure generator means providing input pressurized oil to said second piston to operate in series initially said second piston and then said first piston, and a foot actuated brake pedal mechanically linked to said second piston to operate in series initially said second piston and then said first piston.

* * * * *